(12) United States Patent
Orita et al.

(10) Patent No.: US 12,237,472 B2
(45) Date of Patent: Feb. 25, 2025

(54) SECONDARY BATTERY (71) Applicant: LG ENERGY SOLUTION, LTD., Seoul (KR)

(72) Inventors: Akihiro Orita, Tokyo (JP); Yasuhiko Yoshinari, Tokyo (JP); Hideyuki Ogawa, Tokyo (JP); Minoru Hoshino, Tokyo (JP); Masayo Horikawa, Tokyo (JP); Yusuke Sera, Tokyo (JP); Suguru Ueda, Tokyo (JP); Hiroki Mikuni, Tokyo (JP)

(73) Assignee: LG ENERGY SOLUTION, LTD., Seoul (KR)

( * ) Notice: Subject to any disclaimer, the term of this patent is extended or adjusted under 35 U.S.C. 154(b) by 502 days.

(21) Appl. No.: 17/617,588

(22) PCT Filed: Jun. 9, 2020

(86) PCT No.: PCT/JP2020/022702
§ 371 (c)(1),
(2) Date: Dec. 9, 2021

(87) PCT Pub. No.: WO2020/250890
PCT Pub. Date: Dec. 17, 2020

(65) Prior Publication Data
US 2022/0246897 A1 Aug. 4, 2022

(30) Foreign Application Priority Data

Jun. 13, 2019 (WO) .................. PCT/JP2019/023562

(51) Int. Cl.
| | |
|---|---|
| *H01M 10/0569* | (2010.01) |
| *H01M 4/02* | (2006.01) |
| *H01M 4/04* | (2006.01) |
| *H01M 4/131* | (2010.01) |
| *H01M 4/38* | (2006.01) |
| *H01M 4/46* | (2006.01) |
| *H01M 4/505* | (2010.01) |
| *H01M 4/525* | (2010.01) |
| *H01M 4/58* | (2010.01) |
| *H01M 4/66* | (2006.01) |
| *H01M 10/0525* | (2010.01) |
| *H01M 10/0568* | (2010.01) |

(52) U.S. Cl.
CPC ..... *H01M 10/0569* (2013.01); *H01M 4/0404* (2013.01); *H01M 4/131* (2013.01); *H01M 4/386* (2013.01); *H01M 4/387* (2013.01); *H01M 4/463* (2013.01); *H01M 4/505* (2013.01); *H01M 4/525* (2013.01); *H01M 4/58* (2013.01); *H01M 4/661* (2013.01); *H01M 10/0525* (2013.01); *H01M 10/0568* (2013.01); *H01M 2004/027* (2013.01); *H01M 2004/028* (2013.01); *H01M 2300/0028* (2013.01); *H01M 2300/0034* (2013.01)

(58) Field of Classification Search
None
See application file for complete search history.

(56) References Cited

U.S. PATENT DOCUMENTS

| | | |
|---|---|---|
| 2004/0081891 A1 | 4/2004 | Yamaguchi et al. |
| 2005/0074675 A1 | 4/2005 | Nishijima et al. |
| 2007/0037063 A1 | 2/2007 | Choi et al. |
| 2007/0231705 A1 | 10/2007 | Ohzuku et al. |
| 2011/0281173 A1 | 11/2011 | Singh et al. |
| 2014/0363706 A1 | 12/2014 | Boxley et al. |
| 2015/0303520 A1 | 10/2015 | Kaiduka et al. |
| 2016/0248122 A1 | 8/2016 | Hwang et al. |
| 2017/0207484 A1 | 7/2017 | Zhamu et al. |
| 2019/0393556 A1 | 12/2019 | Matsuoka et al. |
| 2020/0350631 A1 | 11/2020 | Mikhaylik et al. |

FOREIGN PATENT DOCUMENTS

| | | | |
|---|---|---|---|
| CN | 1504000 A | | 4/2004 |
| CN | 106532094 A | | 3/2017 |
| JP | H04026075 A | | 1/1992 |
| JP | 2002158038 A | * | 5/2002 |

(Continued)

OTHER PUBLICATIONS

Machine Translation of JP-2002158038-A. (Year: 2002).*
Machine Translation of JP-2002280070-A (Year: 2002).*
International Search Report dated Sep. 1, 2020 for PCT/JP2020/022702.
International Search Report dated Aug. 11, 2020 for PCT/JP2020/022705.
Soei Patent and Law Firm, Statement of Related Matters, dated Dec. 17, 2021.
Atetegeb Meazah Haregewoin et al, "Electrolyte additives for lithium ion battery electrodes: progress and perspectives", Energy & Environmental Science, vol. 9, No. 6, May 6, 2016, P. 1955-P. 1988.
Extended Search Report in corresponding European Application No. 20822391.7, dated Jul. 7, 2022.
Extended Search Report in corresponding European Application No. 20823607.5, dated Jul. 5, 2022.

(Continued)

Primary Examiner — Gregg Cantelmo
(74) Attorney, Agent, or Firm — Bryan Cave Leighton Paisner LLP (57) ABSTRACT

A secondary battery includes: a positive electrode current collector; a negative electrode current collector; a positive electrode electrolytic solution part provided so as to be in contact with the positive electrode current collector, the positive electrode electrolytic solution part containing a positive electrode electrolytic solution; and a negative electrode electrolytic solution part provided so as to be in contact with the negative electrode current collector, the negative electrode electrolytic solution part containing a negative electrode electrolytic solution. The positive electrode electrolytic solution contains a positive electrode active material, an electrolyte salt, and a non-aqueous solvent containing a first solvent. The negative electrode electrolytic solution contains a negative electrode active material, an electrolyte salt, and a non-aqueous solvent containing a second solvent. The second solvent is a solvent having a reduction potential that is lower than an eigenvalue depending on the negative electrode active material.

11 Claims, 2 Drawing Sheets

(56) References Cited

FOREIGN PATENT DOCUMENTS

| | | | |
|---|---|---|---|
| JP | 2002280070 A * | 9/2002 | |
| JP | 2002-319434 | 10/2002 | |
| JP | 2002319434 A | 10/2002 | |
| JP | 2003-197259 | 7/2003 | |
| JP | 2003197259 A | 7/2003 | |
| JP | 2005-322597 | 11/2005 | |
| JP | 2005322597 A | 11/2005 | |
| JP | 2007-019027 | 1/2007 | |
| JP | 2007-273405 | 10/2007 | |
| JP | 2007273405 A | 10/2007 | |
| JP | 2010511995 A | 4/2010 | |
| JP | 2010-192255 | 9/2010 | |
| JP | 2010192255 A | 9/2010 | |
| JP | 2011-086599 | 4/2011 | |
| JP | 2012-043814 | 3/2012 | |
| JP | 2012043814 A | 3/2012 | |
| JP | 2012146490 A | 8/2012 | |
| JP | 2012146491 A | 8/2012 | |
| JP | 2012146492 A | 8/2012 | |
| JP | 2012160435 A | 8/2012 | |
| JP | 2013510391 A | 3/2013 | |
| JP | 2018-078103 | 5/2018 | |
| JP | 2018078103 A | 5/2018 | |
| JP | 2018-170163 | 11/2018 | |
| JP | 2019-040676 | 3/2019 | |
| KR | 20090063174 | 6/2009 | |
| TW | 543223 | 7/2003 | |
| TW | 201635627 | 10/2016 | |
| TW | 201840052 | 11/2018 | |
| WO | 2014/068903 | 5/2014 | |
| WO | 2014068903 A1 | 5/2014 | |
| WO | 2015/093411 | 6/2015 | |
| WO | 2018/221346 | 12/2018 | |

OTHER PUBLICATIONS

International Preliminary Report on Patentability with Written Opinion dated Dec. 23, 2021 for PCT/JP2020/022702.
International Preliminary Report on Patentability with Written Opinion dated Dec. 23, 2021 for PCT/JP2020/022705.

* cited by examiner

SECONDARY BATTERY

CROSS-REFERENCE TO RELATED APPLICATIONS

This application is a 35 U.S.C. § 371 national phase application of PCT/JP2020/022702, filed on Jun. 9, 2020, which claims priority to international application PCT/JP2019/023562, filed on Jun. 13, 2019.

TECHNICAL FIELD

The present invention relates to a secondary battery.

BACKGROUND ART

In recent years, according to a spread of portable electronic devices, electric vehicles, and the like, in secondary batteries typified by lithium ion secondary batteries, further improvement in performance is required. For example, Patent Literature 1 discloses a secondary battery capable of attaining good cycle characteristics.

CITATION LIST

Patent Literature

Patent Literature 1: WO 2018/221346

SUMMARY OF INVENTION

Technical Problem

In recent years, as a next-generation secondary battery concept, it has been studied to increase the voltage. However, in secondary batteries, in the case of using an electrode material causing a high voltage, generally, an electrolytic solution is decomposed in a positive electrode or a negative electrode, and thus battery performance may deteriorate. This tendency is significant in the negative electrode.

In this regard, an object of the present invention is to provide a secondary battery capable of suppressing a decrease in battery performance even in the case of increasing the voltage.

Solution to Problem

An aspect of the present invention relates to a secondary battery. This secondary battery includes: a positive electrode current collector; a negative electrode current collector; a positive electrode electrolytic solution part provided between the positive electrode current collector and the negative electrode current collector so as to be in contact with the positive electrode current collector, the positive electrode electrolytic solution part containing a positive electrode electrolytic solution; and a negative electrode electrolytic solution part provided between the positive electrode current collector and the negative electrode current collector so as to be in contact with the negative electrode current collector, the negative electrode electrolytic solution part containing a negative electrode electrolytic solution. The positive electrode electrolytic solution contains an electrolyte salt and a non-aqueous solvent containing a first solvent, and the negative electrode electrolytic solution contains an electrolyte salt and a non-aqueous solvent containing a second solvent. The second solvent is a solvent having a reduction potential that is lower (less noble) than a potential of negative electrode. According to such a secondary battery, by using the second solvent, the reductive decomposition of the electrolytic solution in the negative electrode can be suppressed, and even in the case of increasing the voltage, a decrease in battery performance can be suppressed.

The first solvent is a solvent having an oxidation potential that is higher (nobler) than a potential of positive electrode. By using the first solvent, the oxidative decomposition of the electrolytic solution in the positive electrode can be suppressed, and even in the case of increasing the voltage, a decrease in battery performance can be suppressed much more.

The secondary battery may further include an electrolyte layer between the positive electrode electrolytic solution part and the negative electrode electrolytic solution part.

The positive electrode electrolytic solution part may further contain a polymer capable of gelling the non-aqueous solvent. The negative electrode electrolytic solution part may further contain a polymer capable of gelling the non-aqueous solvent. When the positive electrode electrolytic solution part and/or the negative electrode electrolytic solution part further contains a polymer capable of gelling the non-aqueous solvent, since the non-aqueous solvent is gelled, the liquid leakage of the non-aqueous solvent is suppressed, and thus a secondary battery excellent in safety may be obtained.

The second solvent may be at least one selected from the group consisting of 12-crown-4, 18-crown-6, 1,2-dimethoxyethane, tetraethylene glycol dimethyl ether, γ-butyrolactone, 1-methyl-2-pyrrolidinone, ethyl heptanoate, tetrahydrofuran, ethylene glycol bis(propionitrile)ether, 2-(methylamino)ethanol, and diaminohexane. A content of the second solvent may be 10% by mass or more on a basis of a total amount of the non-aqueous solvent in the negative electrode electrolytic solution. By using such a second solvent, the generation of a film, which is called a solid-electrolyte-interface (SEI), on the surface of a negative electrode active material can be suitably controlled.

The first solvent may be at least one selected from the group consisting of tris(2,2,2-trifluoroethyl)phosphate, acetonitrile, succinonitrile, adiponitrile, chloroethylene carbonate, nitromethane, and ethylene carbonate. A content of the first solvent may be 10% by mass or more on a basis of a total amount of the non-aqueous solvent in the positive electrode electrolytic solution.

The non-aqueous solvent contained in the positive electrode electrolytic solution and the non-aqueous solvent contained in the negative electrode electrolytic solution may be different from each other.

The negative electrode electrolytic solution part may further contain a negative electrode active material containing silicon as a constituent element and a binder. In this case, the negative electrode active material is retained in the negative electrode current collector.

The positive electrode electrolytic solution part may further contain a positive electrode active material and a binder. The positive electrode active material may be a positive electrode active material having an operating potential of 4 V or more (an operating potential of 4 V (vs $Li^+/Li$) or more) with respect to a metallic lithium potential. In this case, the positive electrode active material is retained in the positive electrode current collector.

Advantageous Effects of Invention

According to the present invention, there is provided a secondary battery capable of suppressing a decrease in battery performance even in the case of increasing the voltage.

DESCRIPTION OF EMBODIMENTS

Hereinafter, embodiments of the present invention will be described with reference to the drawings as appropriate. However, the present invention is not limited to the following embodiments. In the following embodiment, constituent elements thereof (including steps and the like) are not necessarily indispensable unless otherwise stated. The sizes of constituent elements in respective drawings are only illustrative, and relative size relationships between constituent elements are not limited to those illustrated in respective drawings.

In the present specification, a numerical value and a range thereof are not intended to limit the present invention. In the present specification, a numerical range that has been indicated by use of "to" indicates the range that includes the numerical values which are described before and after "to", as the minimum value and the maximum value, respectively. In the numerical ranges that are described as stages in the present specification, the upper limit value or the lower limit value of the numerical range of a certain stage may be replaced with the upper limit value or the lower limit value of the numerical range of another stage. In the numerical ranges that are described in the present specification, the upper limit value or the lower limit value of the numerical value range may be replaced with the value shown in Examples.

Figure 1:
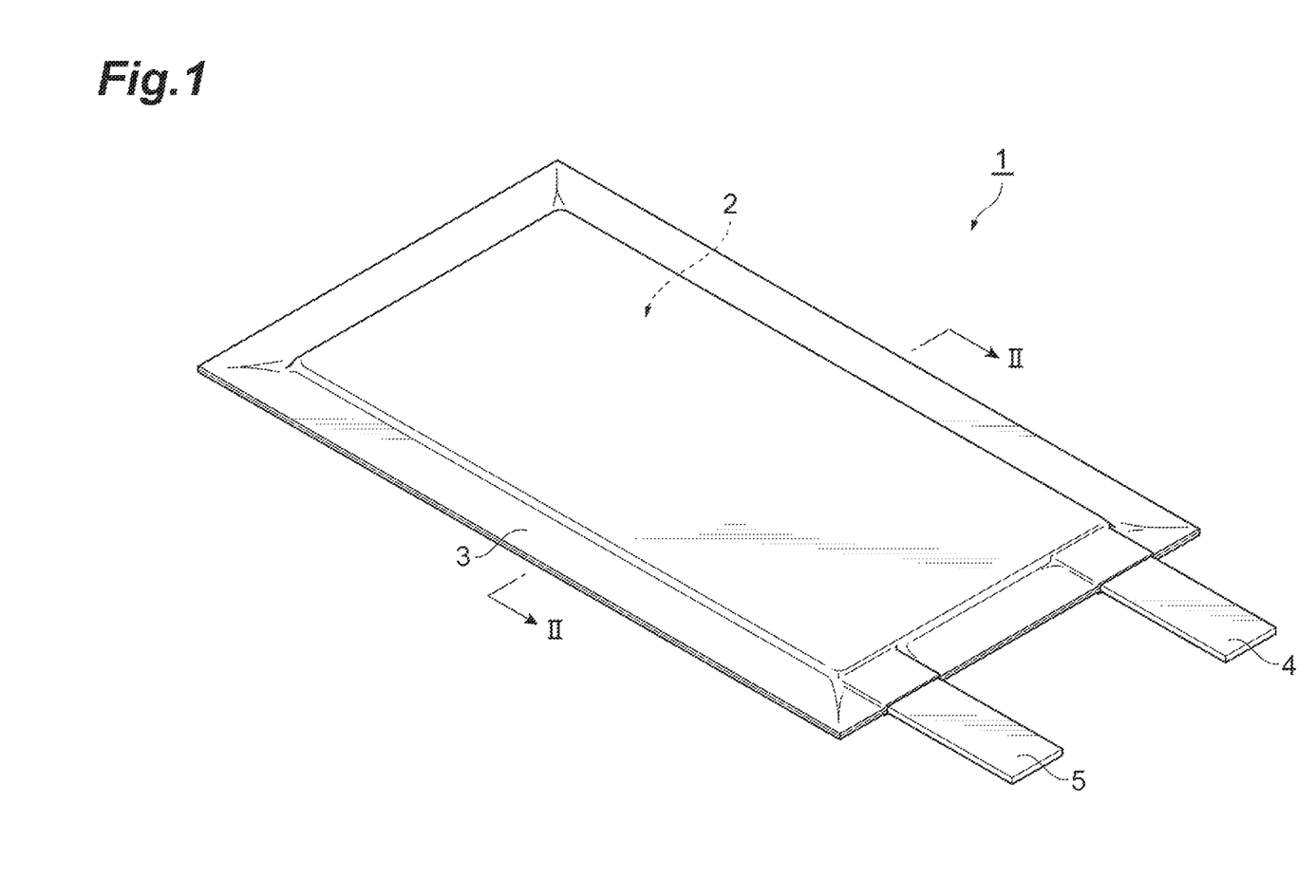
FIG. 1 is a perspective view illustrating a secondary battery according to an embodiment.

FIG. 1 is a perspective view illustrating a secondary battery according to an embodiment. As illustrated in FIG. 1, a secondary battery 1 according to an embodiment is a so-called laminate type secondary battery that includes an electrode group 2 and a pouch-shaped battery outer casing body 3 accommodating the electrode group 2. A positive electrode current collector tab 4 and a negative electrode current collector tab 5 are provided in the electrode group 2. The positive electrode current collector tab 4 and the negative electrode current collector tab 5 protrude from the inside of the battery outer casing body 3 to the outside so that each of the positive electrode current collector and the negative electrode current collector (details thereof will be described below) can be electrically connected to the outside of the secondary battery 1. In another embodiment, the secondary battery 1 may be a secondary battery having a shape (a coin shape, a cylindrical shape, or the like) other than the laminate type. The secondary battery 1 may be a lithium ion secondary battery.

The battery outer casing body 3 may be, for example, a container formed of a laminate film. The laminate film may be, for example, a laminate film in which a polymer film such as a polyethylene terephthalate (PET) film, a metallic foil such as aluminum, copper, or stainless steel, and a sealant layer such as polypropylene are laminated in this order.

Figure 2A:
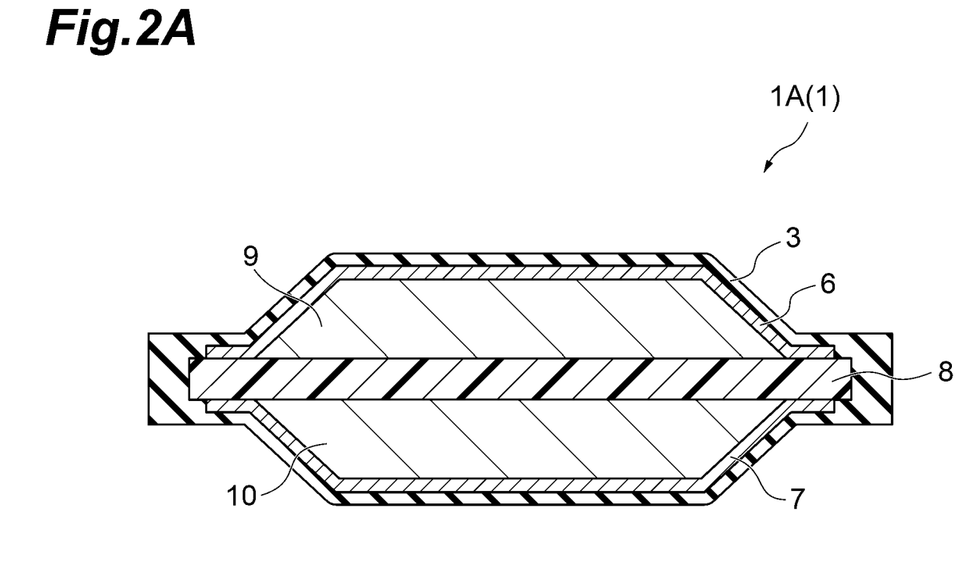
FIG. 2A is a schematic cross-sectional view taken along line II-II in FIG. 1 illustrating an embodiment of the secondary battery.
Figure 2B:
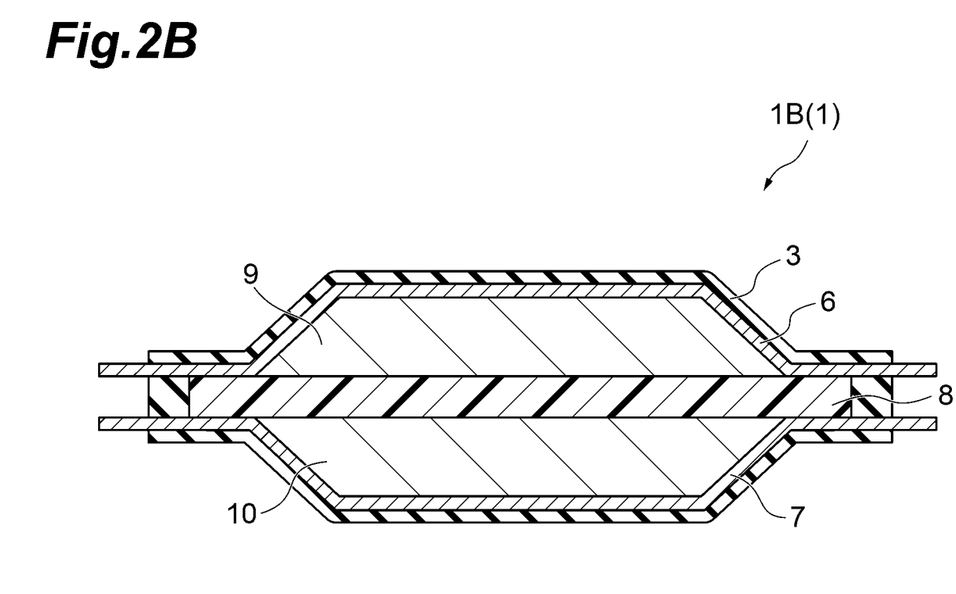
FIG. 2B is a schematic cross-sectional view taken along line II-II in FIG. 1 illustrating another embodiment of the secondary battery.

FIG. 2A and FIG. 2B are cross-sectional views taken along line II-II in FIG. 1. As illustrated in FIG. 2A and FIG. 2B, the secondary battery 1 includes: in the battery outer casing body 3, a positive electrode current collector 6; a negative electrode current collector 7; a positive electrode electrolytic solution part 9 provided between the positive electrode current collector 6 and the negative electrode current collector 7 so as to be in contact with the positive electrode current collector 6, the positive electrode electrolytic solution part containing a positive electrode electrolytic solution; and a negative electrode electrolytic solution part 10 provided between the positive electrode current collector 6 and the negative electrode current collector 7 so as to be in contact with the negative electrode current collector 7, the negative electrode electrolytic solution part containing a negative electrode electrolytic solution. The secondary battery 1 may further include, as illustrated in FIG. 2A and FIG. 2B, an electrolyte layer 8 between the positive electrode electrolytic solution part 9 and the negative electrode electrolytic solution part 10. Note that, in a case where both the positive electrode electrolytic solution part 9 and the negative electrode electrolytic solution part 10 further contain a polymer capable of gelling the non-aqueous solvent, since the positive electrode electrolytic solution and the negative electrode electrolytic solution are gelled so that the permeation of the non-aqueous solvent or the like is difficult to proceed, the secondary battery 1 may or may not include the electrolyte layer 8 between the positive electrode electrolytic solution part 9 and the negative electrode electrolytic solution part 10.

The battery outer casing body 3 is sealed so that the positive electrode electrolytic solution and the negative electrode electrolytic solution are not caused to leak out from the positive electrode electrolytic solution part 9 and the negative electrode electrolytic solution part 10, respectively. In an embodiment, as illustrated in FIG. 2A, the entirety of the positive electrode current collector 6 and the negative electrode current collector 7 may be accommodated inside the battery outer casing body 3. In another embodiment, as illustrated in FIG. 2B, both end portions of the positive electrode current collector 6 and the negative electrode current collector 7 may protrude to the outside of the battery outer casing body 3.

The positive electrode current collector 6 is formed, for example, of aluminum, titanium, stainless steel, nickel, baked carbon, an electrically conductive polymer, electrically conductive glass, or the like. The thickness of the positive electrode current collector 6 may be 1 μm or more and may be 50 μm or less, for example.

The positive electrode electrolytic solution part 9 contains a positive electrode electrolytic solution. The positive electrode electrolytic solution contains an electrolyte salt and a non-aqueous solvent containing a first solvent. The thickness of the positive electrode electrolytic solution part 9 may be 5 μm or more and may be 2000 μm or less, for example.

The electrolyte salt may be, for example, a lithium salt. The lithium salt may be, for example, at least one selected from the group consisting of $LiPF_6$, $LiBF_4$, $LiClO_4$, $LiB(C_6H_5)_4$, $LiCH_3SO_3$, $CF_3SO_2OLi$, $LiN(SO_2F)_2$ (Li[FSI], lithium bisfluorosulfonyl imide), $LiN(SO_2CF_3)_2$ (Li[TFSI], lithium bistrifluoromethanesulfonyl imide), and $LiN(SO_2CF_2CF_3)_2$.

A content of the electrolyte salt may be 0.5 mol/L or more, 0.7 mol/L or more, or 0.8 mol/L or more, and may be 1.5 mol/L or less, 1.3 mol/L or less, or 1.2 mol/L or less, on a basis of a total amount of the non-aqueous solvent.

The non-aqueous solvent is a solvent that can dissolve an electrolyte salt contained in the positive electrode electrolytic solution part 9. The non-aqueous solvent contains a first solvent that can be suitably used only in the positive electrode electrolytic solution (that is not suitable for the negative electrode electrolytic solution). The non-aqueous solvent may be composed of the first solvent. On the other hand, the non-aqueous solvent may contain another solvent that can be suitably used in any of the positive electrode electrolytic solution and the negative electrode electrolytic solution, in addition to the first solvent.

The first solvent is a solvent having oxidative stability with respect to the positive electrode and may be a solvent having an oxidation potential that is higher (nobler) than the potential of positive electrode (an eigenvalue depending on the positive electrode active material). The first solvent may be, for example, a solvent having an oxidation potential of 3.5 V or more, 4.0 V or more, 4.5 V or more, 4.7 V or more, 4.9 V or more, 5.0 V or more, or 5.2 V or more with respect to a metallic lithium potential. The first solvent can be used singly or in combination of two or more kinds thereof.

The oxidation potential of the first solvent can be evaluated, for example, by highest occupied molecular orbital energy (HOMO) based on the frontier orbital theory. The computation of the HOMO is preferably conducted by density functional (DFT) computation. The basis function is not particularly limited, but 6-31G(d), 6-31G(d,p), or the like is preferably used. In a case where the first solvent is used in combination of two or more kinds thereof, for example, the HOMO may be averaged and used as an index in accordance with the volume ratio of the first solvent, or the HOMO may be experimentally evaluated, for example, as follows. That is, a glassy carbon electrode or the like is used, the potential is swept to a noble potential by linear sweep voltammetry, and for example, a potential at which the oxidation current generated by decomposition is 50 mA/cm$^2$ or more may be regarded as the oxidation potential. Note that, in the case of comparing the oxidation potentials, comparison is conducted by the same method and on the basis of the same criteria among these techniques.

Specific examples of the first solvent include ethylene carbonate, hexafluoroisopropyl-ethylene carbonate, trans-difluoroethylene carbonate, cis-difluoroethylene carbonate, trishexafluoroisopropyl phosphate, tris(2,2,2-trifluoroethyl) phosphate, 1,1,2,2-tetrafluoroethyl-2,2,3,3-tetrafluoropropyl ether, acetonitrile, succinonitrile, glutaronitrile, adiponitrile, chloroethylene carbonate, and nitromethane. Among these, the first solvent may be at least one selected from the group consisting of tris(2,2,2-trifluoroethyl)phosphate, acetonitrile, succinonitrile, adiponitrile, chloroethylene carbonate, nitromethane, and ethylene carbonate.

A content of the first solvent may be 0.1% by mass or more, 1% by mass or more, 10% by mass or more, 15% by mass or more, or 20% by mass or more, and may be 100% by mass or less, 95% by mass or less, or 90% by mass or less, on a basis of a total amount of the non-aqueous solvent in the positive electrode electrolytic solution part 9.

The other solvent may be an aprotic solvent that neither corresponds to the first solvent nor to a second solvent described below. Examples of the other solvent include diethyl carbonate, dimethyl ether, diethyl ether, dioxolane, 4-methyl dioxolane, sulfolane, dimethyl sulfoxide, propionitrile, benzonitrile, N,N-dimethylacetamide, and diethylene glycol.

A content of the other solvent may be 1% by mass or more, 3% by mass or more, or 5% by mass or more, and may be 95% by mass or less, 90% by mass or less, or 80% by mass or less, on the basis of the total amount of the non-aqueous solvent in the positive electrode electrolytic solution part 9.

The positive electrode electrolytic solution part 9 may further contain a positive electrode active material. In one aspect (a first aspect), the positive electrode active material may exist in a state of being dispersed in the positive electrode electrolytic solution (a state of being not retained (fixed) in the positive electrode current collector 6). In another aspect (a second aspect), it may exist in a state of being retained (fixed) in the positive electrode current collector 6 (a state of providing a positive electrode mixture layer including the positive electrode active material on the positive electrode current collector 6). In a case where the positive electrode active material exists as in the first aspect, the positive electrode electrolytic solution part 9 may further contain a conductive member having a mesh structure and disposed so as to bring the positive electrode current collector and the electrolyte layer into conduction and an electrically conductive agent, and the positive electrode active material may be retained in the conductive member. In a case where the positive electrode active material exists as in the second aspect, the positive electrode electrolytic solution part 9 may further contain a binder and an electrically conductive agent.

First Aspect

The positive electrode active material may be, for example, a lithium oxide. Examples of the lithium oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$ (in each formula, M represents at least one element selected from the group consisting of Na, Mg, Sc, Y, Mn, Fe, Co, Cu, Zn, Al, Cr, Pb, Sb, V, and B (provided that, M is an element different from other elements in each formula); and x=0 to 1.2, y=0 to 0.9, and z=2.0 to 2.3). The lithium oxide represented by $Li_xNi_{1-y}M_yO_z$ may be $Li_xNi_{1-(y1+y2)}Co_{y1}Mn_{y2}O_z$ (provided that, x and z are the same as those described above, y1=0 to 0.9, y2=0 to 0.9, and y1+y2=0 to 0.9) and may be, for example, $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, or $LiNi_{0.8}Co_{0.1}Mn_{0.1}O_2$. The lithium oxide represented by $Li_xNi_{1-y}M_yO_z$ may be $Li_xNi_{1-(y3+y4)}Co_{y3}Al_{y4}O_z$ (provided that, x and z are the same as those described above, y3=0 to 0.9, y4=0 to 0.9, and y3+y4=0 to 0.9), and may be, for example, $LiNi_{0.8}Co_{0.15}Al_{0.05}O_2$.

The positive electrode active material may be, for example, a phosphoric salt of lithium. Examples of the phosphoric salt of lithium include lithium manganese phosphate ($LiMnPO_4$), lithium iron phosphate ($LiFePO_4$), lithium cobalt phosphate ($LiCoPO_4$), and lithium vanadium phosphate ($Li_3V_2(PO_4)_3$).

A content of the positive electrode active material may be 10 parts by mass or more and may be 80 parts by mass or less, with respect to 100 parts by mass of a total mass of the positive electrode active material, the positive electrode electrolytic solution, and the conductive member contained in the positive electrode electrolytic solution part 9.

The positive electrode active material may be a positive electrode active material having an operating potential of 4 V or more with respect to a metallic lithium potential.

The conductive member has a mesh structure. The conductive member may be provided in a part of the positive electrode electrolytic solution part 9 or may be provided to embed the whole positive electrode electrolytic solution part 9.

The conductive member may have, for example, a sheet shape. The conductive member is formed of an electrically conductive material. Examples of the electrically conductive material include a carbon material, a metal material, and an electrically conductive polymer material.

Examples of the carbon material include carbon black, graphite, soft carbon, hard carbon, carbon nanotube, carbon nanofiber, graphene, carbon nanohorn, glassy carbon, and expanded graphite.

Examples of the metal material include nickel, aluminum, copper, stainless steel, gold, and silver.

Examples of the electrically conductive polymer material include materials with which polymer compounds such as polyacetylene, poly(p-phenylenevinylene), polypyrrole, polythiophene, polyaniline, and poly(p-phenylenesulfide) are doped. The doping method is not particularly limited, but may be a method of adding a compound of an electron acceptor (acceptor) such as iodine or arsenic pentafluoride, an electron donor (donor) such as an alkali metal, or the like to a polymer compound.

In an embodiment, a member formed in a mesh structure in advance may be used as the conductive member. Examples of such a conductive member include a conductive member formed of a carbon material such as carbon felt, carbon paper, or carbon cloth and a conductive member formed of a metal material such as punching metal (a metal plate in which a mesh structure is formed by punching).

The electrically conductive agent may be, for example, a carbon material such as carbon black such as acetylene black or ketjen black, graphite, graphene, carbon nanotube, or carbon nanofiber. These electrically conductive agents may be dispersed in the positive electrode electrolytic solution to form an electron conduction network. The electrically conductive agent has preferably a particle shape and more preferably a bulky particle shape. A content of the electrically conductive agent may be 5 parts by mass or more and may be 50 parts by mass or less, with respect to 100 parts by mass of a total mass of the positive electrode active material, the positive electrode electrolytic solution, and the conductive member contained in the positive electrode electrolytic solution part 9.

Second Aspect

A positive electrode mixture layer according to a second aspect is a layer provided on the positive electrode current collector 6. In an embodiment, the positive electrode mixture layer contains a positive electrode active material, an electrically conductive agent, and a binder. The positive electrode active material and the electrically conductive agent may be the same as exemplified as in the positive electrode active material and the electrically conductive agent in the first aspect.

A content of the positive electrode active material may be 70% by mass or more and may be 95% by mass or less, on a basis of a total mass of the positive electrode mixture layer.

A content of the electrically conductive agent may be 0.1% by mass or more and may be 15% by mass or less, on the basis of the total mass of the positive electrode mixture layer.

The binder is not limited as long as it is decomposed on the surface of the positive electrode mixture layer, but may be a polymer including, as a monomer unit, at least one selected from the group consisting of tetrafluoroethylene, vinylidene fluoride, hexafluoropropylene, acrylic acid, maleic acid, ethyl methacrylate, and methyl methacrylate, a rubber such as styrene-butadiene rubber, isoprene rubber, or acrylic rubber, and the like. The binder is preferably a copolymer including tetrafluoroethylene and vinylidene fluoride as structural units.

A content of the binder may be 0.1% by mass or more and may be 20% by mass or less, on the basis of the total amount of the positive electrode mixture layer.

The thickness of the positive electrode mixture layer may be 10 μm or more, 15 μm or more, or 20 μm or more and may be 100 μm or less, 80 μm or less, or 70 μm or less.

The positive electrode mixture layer can be obtained, for example, by dispersing materials used in the positive electrode mixture layer in a dispersion medium using a kneader, a disperser, or the like to obtain a slurry of a positive electrode mixture, applying this positive electrode mixture onto the positive electrode current collector 6 by a doctor blade method, a dipping method, a spraying method, or the like, and then vaporizing the dispersion medium. After the dispersion medium is vaporized, as necessary, a compression-molding step using a roll press may be provided. The positive electrode mixture layer may be formed as a positive electrode mixture layer having a multi-layered structure by performing steps from application of the positive electrode mixture to vaporization of the dispersion medium mentioned above multiple times. The dispersion medium may be water, 1-methyl-2-pyrrolidone (hereinafter, also referred to as NMP), or the like.

In a case where the positive electrode active material exists as in the second aspect, the positive electrode electrolytic solution part 9 may further contain a polymer capable of gelling the non-aqueous solvent. When the positive electrode electrolytic solution part 9 further contains a polymer capable of gelling the non-aqueous solvent, since the non-aqueous solvent is gelled, the liquid leakage of the non-aqueous solvent is suppressed, and thus a secondary battery excellent in safety can be obtained. In this case, when the negative electrode electrolytic solution part 10 further contains a polymer capable of gelling the non-aqueous solvent, since the permeation of the non-aqueous solvent or the like is difficult to proceed, it is not necessary to provide the electrolyte layer 8 between the positive electrode electrolytic solution part 9 and the negative electrode electrolytic solution part 10 in the secondary battery.

In the present specification, the polymer capable of gelling the non-aqueous solvent (non-aqueous solvent gelling polymer) means a polymer that can considerably decrease flowability of the non-aqueous solvent, and specifically means a polymer in which a distance between a position A and a position B in the flowability evaluation as will be described below is less than 1 cm.

First, 5 g of a mixture of the non-aqueous solvent and the non-aqueous solvent gelling polymer (the non-aqueous solvent/the non-aqueous solvent gelling polymer=90/10 (mass ratio)) is put into a glass vial (manufactured by AS ONE CORPORATION, LABORAN screw tube jar No. 4, 13.5 mL, a cylindrical shape having a diameter of bottom surface of about 2 cm and a height of about 4 cm) and then is covered with a lid. Subsequently, the non-aqueous solvent gelling polymer is melted at a temperature equal to or higher than the glass transition temperature of the non-aqueous solvent gelling polymer and then left to stand still at 25° C. for 20 hours in a state where the bottom surface side of the glass vial faces downward and the lid side faces upward. The position of the outermost surface of the mixture of the non-aqueous solvent and the non-aqueous solvent gelling polymer in the glass vial after being left to stand still (the surface furthest away from the bottom surface of the glass vial) is designated as the position A. Thereafter, the glass vial is left to stand still at 25° C. for 10 minutes in a state where the glass vial is placed upside down (the bottom surface side of the glass vial faces upward and the lid side faces downward). The position of the lowermost surface of the mixture of the non-aqueous solvent and the non-aqueous solvent gelling polymer in the glass vial after being left to stand still (the surface furthest away from the bottom surface of the glass vial) is designated as the position B. The flowability is evaluated based on the distance between the position A and the position B obtained in this way.

The non-aqueous solvent gelling polymer may be, for example, a copolymer of vinylidene fluoride and hexafluoropropylene, polyvinylidene fluoride, polyacrylonitrile, polymethyl methacrylate, methyl polyacrylate, poly(N-isopropylacrylamide), poly(diallyldimethyl ammonium-bis(trifluoromethanesulfonyl)imide), or the like. The non-aqueous solvent gelling polymer can be obtained by mixing a monomer or oligomer in a non-aqueous solvent and subjecting the resultant product to polymerization. The polymerization can be performed using a polymerization initiator by heat or light irradiation as necessary.

A content of the non-aqueous solvent gelling polymer may be 0.01 parts by mass or more and may be 20 parts by mass or less, with respect to 100 parts by mass of a total mass of the positive electrode active material, the positive electrode electrolytic solution, and the conductive member contained in the positive electrode electrolytic solution part 9.

The negative electrode current collector 7 is formed, for example, of copper, stainless steel, nickel, aluminum, titanium, baked carbon, an electrically conductive polymer, electrically conductive glass, an aluminum-cadmium alloy, or the like. The thickness of the negative electrode current collector 7 may be 1 μm or more and may be 50 μm or less, for example.

The negative electrode electrolytic solution part 10 contains a negative electrode electrolytic solution. The negative electrode electrolytic solution contains an electrolyte salt and a non-aqueous solvent containing a second solvent. The type and concentration of the electrolyte salt may be the same as the type and concentration of the electrolyte salt of the negative electrode electrolytic solution part 10. The thickness of the negative electrode electrolytic solution part 10 may be 5 μm or more and may be 2000 μm or less, for example.

The non-aqueous solvent is a solvent that can dissolve an electrolyte salt contained in the negative electrode electrolytic solution part 10. The non-aqueous solvent contains a second solvent that can be suitably used only in the negative electrode electrolytic solution (that is not suitable for the positive electrode electrolytic solution). The non-aqueous solvent may be composed of the second solvent. On the other hand, the non-aqueous solvent may contain another solvent that can be suitably used in any of the positive electrode electrolytic solution and the negative electrode electrolytic solution, in addition to the second solvent.

The reduction potential of the second solvent can be evaluated, for example, by lowest unoccupied molecular orbital energy (LUMO) based on the frontier orbital theory. The computation of the LUMO is preferably conducted by density functional (DFT) computation similarly to the HOMO. The basis function is not particularly limited, but 6-31G(d), 6-31G(d,p), or the like is preferably used. In a case where the second solvent is used in combination of two or more kinds thereof, for example, the LUMO may be averaged and used as an index in accordance with the volume ratio of the first solvent, or the HOMO may be experimentally evaluated, for example, as follows. That is, a glassy carbon electrode or the like is used, the potential is swept to a less noble potential by linear sweep voltammetry, and for example, a potential at which the oxidation current generated by decomposition is 50 mA/cm$^2$ or more may be regarded as the reduction potential. Note that, in the case of comparing the reduction potentials, comparison is conducted by the same method and on the basis of the same criteria among these techniques.

Specific examples of the second solvent include γ-butyrolactone, ethyl acetate, ethyl pentanoate, dimethyl malonate, diethyl malonate, diethyl methylmalonate, diethyl succinate, diethyl glutarate, diethyl azelate, ethyl heptanoate, heptanoic acid, tetrahydrofuran, 1,2-dimethoxyethane, ethyl propyl ether, tetraethylene glycol dimethyl ether, ethylene glycol bis(3-aminopropyl)ether, diethylene glycol bis(3-aminopropyl)ether, ethylene glycol bis(propionitrile)ether, bis[2-(2-methoxyethoxy)ethyl ether], 12-crown-4, 18-crown-6, taurine, N-methyltaurine, 2-(methylamino)ethanol, diaminohexane, methylenebis(2-chloroaniline), 1-methyl-2-pyrrolidinone, 1,3-dimethyl-2-imidazolidinone, N,N-dimethylformacetamide, N-methyl-piperazine, trimethylamine, triethylamine, N,N-dimethylpropylamine, dimethylformamide, diethylformamide, 1,1,3,3-tetramethylurea, N,N-dimethyl-propyleneurea, cyclohexane, piperidine, cyclopentane, decahydronaphthalene, tetrahydronaphthalene, pyrrolidine, quinoline, and 3-pyrroline. Among these, the second solvent may be at least one selected from the group consisting of 12-crown-4, 18-crown-6, 1,2-dimethoxyethane, tetraethylene glycol dimethyl ether, γ-butyrolactone, 1-methyl-2-pyrrolidinone, ethyl heptanoate, tetrahydrofuran, ethylene glycol bis(propionitrile)ether, 2-(methylamino)ethanol, and diaminohexane. By using such a second solvent, the generation of SEI on the surface of the negative electrode active material can be suitably suppressed.

Furthermore, specific examples of the second solvent include vinylene carbonate, propane sultone, 1,4-butane sultone, 1,3-propene sultone, ethylmethane sultone, ethylene sulfite, trifluoromethane ethylene carbonate, fluorobenzene, and fluoroethylene carbonate. Among these, the second solvent may be vinylene carbonate or fluoroethylene carbonate. By using such a second solvent, the generation of SEI on the surface of the negative electrode active material can be suitably suppressed.

A content of the second solvent may be 0.1% by mass or more, 1% by mass or more, 10% by mass or more, 15% by mass or more, or 20% by mass or more, and may be 100% by mass or less, 95% by mass or less, or 90% by mass or less, on a basis of the total amount of the non-aqueous solvent in the negative electrode electrolytic solution part 10.

The other solvent may be the same as exemplified as in the other solvent in the positive electrode electrolytic solution part 9. A content of the other solvent may be 1% by mass or more, 3% by mass or more, or 5% by mass or more, and may be 95% by mass or less, 90% by mass or less, or 80% by mass or less, on the basis of the total amount of the non-aqueous solvent in the negative electrode electrolytic solution part 10.

The negative electrode electrolytic solution part 10 may further contain a negative electrode active material. In one aspect (a third aspect), the negative electrode active material may exist, similarly to the positive electrode active material, in a state of being dispersed in the negative electrode electrolytic solution (a state of being not retained (fixed) in the negative electrode current collector 7). In another aspect (a fourth aspect), it may exist in a state of being retained (fixed) in the negative electrode current collector 7 (a state of providing a negative electrode mixture layer including the negative electrode active material on the negative electrode current collector 7). In a case where the negative electrode active material exists as in the third aspect, the negative electrode electrolytic solution part 10 may further contain a conductive member having a mesh structure and disposed so as to bring the negative electrode current collector and the electrolyte layer into conduction and an electrically conductive agent, and the negative electrode active material may be retained in the conductive member. In a case where the negative electrode active material exists as in the fourth aspect, the negative electrode electrolytic solution part 10 may further contain a binder and an electrically conductive agent.

Third Aspect

The negative electrode active material can employ one that can be commonly used in the energy device field. Specific examples of the negative electrode active material include metallic lithium, lithium titanate ($Li_4Ti_5O_{12}$), a lithium alloy or another metal compound, a carbon material, a metal complex, and an organic polymer compound. The negative electrode active material may be one kind of these materials only, or a mixture of two or more kinds thereof. Examples of the carbon material include graphite such as natural graphite (such as flake graphite) or artificial graphite, amorphous carbon, carbon fiber, and carbon black such as acetylene black, ketjen black, channel black, furnace black, lamp black, or thermal black. From the viewpoint of obtaining a larger theoretical capacity (for example, 500 to 1500 Ah/kg), the negative electrode active material may be a negative electrode active material containing silicon as a constituent element, a negative electrode active material containing tin as a constituent element, or the like. Among these, the negative electrode active material may be a negative electrode active material containing silicon as a constituent element.

The negative electrode active material containing silicon as a constituent element may be an alloy containing silicon as a constituent element, and may be, for example, an alloy containing silicon and at least one selected from the group consisting of nickel, copper, iron, cobalt, manganese, zinc, indium, silver, titanium, germanium, bismuth, antimony, and chromium as a constituent element. The negative electrode active material containing silicon as a constituent element may be an oxide, a nitride, or a carbide, and specifically, may be, for example, a silicon oxide such as SiO, $SiO_2$, or LiSiO, a silicon nitride such as $Si_3N_4$ or $Si_2N_2O$, a silicon carbide such as SiC, or the like.

A content of the negative electrode active material may be 10 parts by mass or more and may be 80 parts by mass or less, with respect to 100 parts by mass of a total mass of the negative electrode active material, the negative electrode electrolytic solution, and the conductive member contained in the negative electrode electrolytic solution part 10.

The conductive member may be the same as exemplified as in the conductive member contained in the positive electrode electrolytic solution part 9. The conductive member may be provided in a part of the negative electrode electrolytic solution part 10 and may be provided to embed the whole negative electrode electrolytic solution part 10.

The electrically conductive agent may be the same as exemplified as in the electrically conductive agent contained in the positive electrode electrolytic solution part 9. A content of the electrically conductive agent may be 5 parts by mass or more and may be 50 parts by mass or less, with respect to 100 parts by mass of the total mass of the negative electrode active material, the negative electrode electrolytic solution, and the conductive member contained in the negative electrode electrolytic solution part 10.

In a conventional secondary battery in which the negative electrode active material is retained on the negative electrode current collector 7, when the negative electrode active material is micronized by charging and discharging of the secondary battery, the negative electrode active material is dropped out from the negative electrode current collector 7, and thus the electrode including the negative electrode active material cannot function, so that the discharge capacity or the like of the secondary battery may be decreased. On the other hand, in the secondary battery in a case where the negative electrode active material exists as in the third aspect, since the negative electrode active material is not fixed to the negative electrode current collector 7 through a binder and is dispersed in the negative electrode electrolytic solution, as compared to the conventional secondary battery in which the negative electrode active material is retained on the negative electrode current collector, a decrease in discharge capacity caused by the micronization of the negative electrode active material can be suppressed.

Fourth Aspect

A negative electrode mixture layer according to a fourth aspect is a layer provided on the negative electrode current collector 7. In an embodiment, the negative electrode mixture layer contains a negative electrode active material, an electrically conductive agent, and a binder. The negative electrode active material and the electrically conductive agent may be the same as exemplified as in the negative electrode active material and the electrically conductive agent in the third aspect.

A content of the negative electrode active material may be 70% by mass or more and may be 95% by mass or less, on a basis of a total mass of the negative electrode mixture layer.

A content of the electrically conductive agent may be 0.1% by mass or more and may be 15% by mass or less, on the basis of the total mass of the negative electrode mixture layer.

The binder may be the same as exemplified as in the binder contained in the positive electrode mixture layer according to the second aspect. A content of the binder may be 0.1% by mass or more and may be 20% by mass or less, on the basis of the total amount of the negative electrode mixture layer.

The thickness of the negative electrode mixture layer may be 10 μm or more, 15 μm or more, or 20 μm or more. The thickness of the negative electrode mixture layer may be 100 μm or less, 80 μm or less, or 70 μm or less.

In a case where the negative electrode active material exists as in the fourth aspect, the negative electrode electrolytic solution part 10 may further contain a polymer capable of gelling the non-aqueous solvent. When the negative electrode electrolytic solution part 10 further contains a polymer capable of gelling the non-aqueous solvent, since the non-aqueous solvent is gelled, the liquid leakage of the non-aqueous solvent is suppressed, and thus a secondary battery excellent in safety may be obtained.

The non-aqueous solvent gelling polymer may be same as exemplified as in the non-aqueous solvent gelling polymer contained in the positive electrode mixture layer according to the second aspect. A content of the non-aqueous solvent gelling polymer may be 0.01 parts by mass or more and may be 20 parts by mass or less, with respect to 100 parts by mass of a total mass of the negative electrode active material, the negative electrode electrolytic solution, and the conductive member contained in the negative electrode electrolytic solution part 10.

The secondary battery 1 may further contain the electrolyte layer 8 between the positive electrode electrolytic solution part 9 and the negative electrode electrolytic solution part 10. The electrolyte layer 8 is a layer that allows cations derived from the electrolyte salt (for example, lithium cations) contained in the positive electrode electrolytic solution part 9 and the negative electrode electrolytic solution part 10 to pass through the layer and does not allow active materials (the positive electrode active material and the negative electrode active material) and components other than the cations (for example, the non-aqueous solvent) included in the positive electrode electrolytic solution part 9 and the negative electrode electrolytic solution part 10 to pass through the layer. The electrolyte layer 8 may be, for example, an electrolyte layer 8 that is non-porous (an electrolyte layer 8 having no pores). The thickness of the electrolyte layer 8 is preferably 1 μm or more from the viewpoint of obtaining superior strength, and is preferably 500 μm or less from the viewpoint that the resistance of ion conduction in the electrolyte layer 8 is reduced, and as a result, the resistance of the secondary battery 1 can be reduced. Note that, in a case where both the positive electrode electrolytic solution part 9 and the negative electrode electrolytic solution part 10 further contains a polymer capable of gelling the non-aqueous solvent, since the positive electrode electrolytic solution and the negative electrode electrolytic solution are gelled so that the permeation of the non-aqueous solvent or the like is difficult to proceed, the secondary battery 1 may or may not contain the electrolyte layer 8 between the positive electrode electrolytic solution part 9 and the negative electrode electrolytic solution part 10.

Such an electrolyte layer 8 may be a solid electrolyte material showing lithium ion conductivity, may be formed of, for example, an oxide-based solid electrolyte, and may be formed of a polymer. In an embodiment, the electrolyte layer 8 may be, for example, a perfluorosulfonic acid-based ion-exchange membrane. The perfluorosulfonic acid-based ion-exchange membrane is, for example, composed of a polymer having a structural unit represented by Formula (1) below.

[Chemical Formula 1]

[In the formula, x, y, m, and n represent an integer of 1 to 20, an integer of 1 to 1000, an integer of 0 or 1, and an integer of 1 to 10, respectively, and X represents a hydrogen atom, an alkali metal atom, or an alkali earth metal atom.]

Such a polymer can be synthesized, for example, by a known method and can also be purchased as Nafion (registered trademark, manufactured by DowDuPont, Inc.), Dow Film (manufactured by DowDuPont, Inc.), Aciplex (registered trademark, manufactured by Asahi Kasei Corp.), or Flemion (registered trademark, manufactured by AGC Inc.).

In another embodiment, the polymer constituting the electrolyte layer 8 may be, for example, polyvinyl alcohol, polyacrylamide, polyvinylpyrrolidone, polyethylene oxide, polyacrylic acid, polymethacrylic acid, sulfonated polyimide, sulfonated poly(etheretherketone), sulfonated poly (ether sulfone), or sulfonated poly(p-phenylene). These polymers are preferably ion-exchanged for use.

The aforementioned secondary battery 1 can be produced by utilizing a known production method. In the secondary battery 1 according to the present embodiment, since the positive electrode electrolytic solution part 9 and the negative electrode electrolytic solution part 10 are independently (separately) provided, in the positive electrode electrolytic solution part 9, the first solvent that is suitable only for the positive electrode electrolytic solution can be used and the second solvent that is suitable only for the negative electrode electrolytic solution may not be used. Furthermore, in the negative electrode electrolytic solution part 10, the second solvent that is suitable only for the negative electrode electrolytic solution can be used and the first solvent that is suitable only for the positive electrode electrolytic solution may not be used. That is, the non-aqueous solvent contained in the positive electrode electrolytic solution and the non-aqueous solvent contained in the negative electrode electrolytic solution described below may be different from each other, and electrolytic solutions having compositions suitable for respective electrodes can be separately used as the positive electrode electrolytic solution and the negative electrode electrolytic solution. On the other hand, in a conventional secondary battery using the common electrolytic solution in the positive electrode and the negative electrode, for example, in the case of adding a component suitable for the negative electrode to the electrolytic solution, when this component is not suitable for the positive electrode, the addition amount or the like may be restricted so that the performance of the whole secondary battery is not degraded. Therefore, in the secondary battery of the present embodiment in which such a restriction does not occur, as compared to the conventional secondary battery using the common electrolytic solution in the positive electrode and the negative electrode, the performance of the secondary battery can be improved.

EXAMPLES

Examples 1 to 9

Example 1

(Production of Secondary Battery)

50 parts by mass of $LiNi_{0.5}Mn_{1.5}O_2$ (oxidation-reduction potential: 4.8 V (vs $Li^+/Li$)) and 20 parts by mass of acetylene black were dispersed in 30 parts by mass of acetonitrile (dehydration grade) and 3 parts by mass of $LiBF_4$ (manufactured by KISHIDA CHEMICAL Co., Ltd.) by a ball mill, thereby producing a positive electrode electrolytic solution. Furthermore, 50 parts by mass of Si (manufactured by Aldrich, Inc., nano silicon (100 nm or less), oxidation-reduction potential: 0.4 V (vs $Li^+/Li$)) and 20 parts by mass of acetylene black were dispersed in 30 parts by mass of 1,2-dimethoxyethane (manufactured by KISHIDA CHEMICAL Co., Ltd.) and 3 parts by mass of $LiBF_4$ while being pulverized by a bead mill, thereby producing a negative electrode electrolytic solution.

Lithium ion conduction glass (manufactured by OHARA INC., LICGC) was prepared as the electrolyte layer. Carbon felt (manufactured by AvCarb Material Solutions, AvCarb G100 Soft Graphite Battery Felt) was disposed as the conductive member on both surfaces of the electrolyte layer. Next, an aluminum foil having a thickness of 20 μm (positive electrode current collector) was disposed on the conductive member of the electrolyte layer on one side and a copper foil having a thickness of 20 μm (negative electrode current collector) was disposed on the conductive member on the other side, thereby obtaining a laminate. Subsequently, the above-described positive electrode electrolytic solution was injected between the positive electrode current collector and the electrolyte layer, the above-described negative electrode electrolytic solution was injected between the negative electrode current collector and the electrolyte layer, and then the laminate was hot-pressed at 40° C. The laminate was covered with an aluminum laminate bag (outer casing body) so that parts of the positive electrode current collector and the negative electrode current collector protruded to the outside, a glass plate was then interposed between both surfaces, and an external pressure of 0.3 MP was applied thereto so as to seal the bag, thereby obtaining a secondary battery.

(Calculation of Oxidation Potential of First Solvent and Reduction Potential of Second Solvent)

The oxidation potential of the first solvent was evaluated by highest occupied molecular orbital energy (HOMO) based on the frontier orbital theory. The computation of the HOMO was conducted by density functional (DFT) and 6-31G(d) was used as the basis function. The oxidation potential of the first solvent with respect to the metallic lithium potential is shown in Table 1. The oxidation potential of the first solvent was higher than the potential (4.8 V (vs $Li^+/Li$)) of the positive electrode in any cases. Next, the reduction potential of the second solvent was evaluated by lowest unoccupied molecular orbital (LUMO) energy based on the frontier orbital theory. The computation of the LUMO was conducted by density functional (DFT) similarly to the HOMO and 6-31G(d) was used as the basis function. The reduction potential of the second solvent with respect to the metallic lithium potential is shown in Table 1. The reduction potential of the second solvent was lower than the potential (0.4 V (vs $Li^+/Li$)) of the negative electrode in any cases.

(Evaluation of Secondary Battery)

The obtained secondary battery was charged at 25° C. at a current corresponding to 0.1 C to 5.0 V and then discharged at a current corresponding to 0.1 C to 3.0 V, and an initial (first cycle) discharge capacity X was measured. This cycle of charging and discharging was performed twice, and then a cycle of charging at a current corresponding to 0.5 C and discharging at a current corresponding to 0.5 C was performed 100 times. A discharge capacity Y after 100 cycles was measured and a discharge capacity retention rate ($=Y/X\times100(\%)$) was calculated to be 92%.

Examples 2 to 9

(Production of Secondary Battery and Evaluation of Secondary Battery)

Production of a secondary battery and evaluation of the secondary battery were performed in the same manner as in Example 1, except that the solvent of the positive electrode electrolytic solution and the solvent of the negative electrode electrolytic solution were changed to solvents shown in Table 1. Note that, the electrolytic solution solvent was used after being subjected to a dehydration treatment as necessary. Results of the capacity retention rate are shown in Table 1.

TABLE 1

| | First solvent | Second solvent | Discharge capacity retention rate [%] after 100 cycles |
|---|---|---|---|
| Exam. 1 | Acetonitrile oxidation potential: 5.2 V (vs $Li^+/Li$) | 1,2-Dimethoxyethane reduction potential: <0.0 V (vs $Li^+/Li$) | 92 |
| Exam. 2 | Tris(2,2,2-trifluoroethyl)phosphate oxidation potential: 5.2 V (vs $Li^+/Li$) | 12-Crown-4 reduction potential: <0.0 V (vs $Li^+/Li$) | 94 |
| Exam. 3 | Adiponitrile oxidation potential: 5.3 V (vs $Li^+/Li$) | 18-Crown-6 reduction potential: <0.0 V (vs $Li^+/Li$) | 95 |
| Exam. 4 | Chloroethylene carbonate oxidation potential: 5.4 V (vs $Li^+/Li$) | Bis[2-(2-methoxyethoxy)ethyl ether] reduction potential: <0.0 V (vs $Li^+/Li$) | 96 |
| Exam. 5 | Nitromethane oxidation potential: 5.3 V (vs $Li^+/Li$) | Ethyl heptanoate reduction potential: <0.0 V (vs $Li^+/Li$) | 90 |
| Exam. 6 | Ethylene carbonate oxidation potential: 4.9 V (vs $Li^+/Li$) | Tetrahydrofuran reduction potential: <0.0 V (vs $Li^+/Li$) | 91 |
| Exam. 7 | Tris(2,2,2-trifluoroethyl)phosphate oxidation potential: 5.2 V (vs $Li^+/Li$) | Ethylene glycol bis(propionitrile)ether reduction potential: <0.0 V (vs $Li^+/Li$) | 93 |
| Exam. 8 | Tris(2,2,2-trifluoroethyl)phosphate oxidation potential: 5.2 V (vs $Li^+/Li$) | 2-(Methylamino)ethanol reduction potential: <0.0 V (vs $Li^+/Li$) | 81 |
| Exam. 9 | Tris(2,2,2-trifluoroethyl)phosphate oxidation potential: 5.2 V (vs $Li^+/Li$) | Diaminohexane reduction potential: <0.0 V (vs $Li^+/Li$) | 87 |

From the above description, it was confirmed that the secondary battery according to an aspect of the present invention can suppress a decrease in discharge capacity and can suppress a decrease in battery performance even in the case of increasing the voltage.

REFERENCE SIGNS LIST

1: secondary battery, 2: electrode group, 3: battery outer casing body, 4: positive electrode current collector tab, 5:

negative electrode current collector tab, 6: positive electrode current collector, 7: negative electrode current collector, 8: electrolyte layer, 9: positive electrode electrolytic solution part, 10: negative electrode electrolytic solution part.

The invention claimed is:

1. A secondary battery comprising:
   a positive electrode current collector;
   a negative electrode current collector;
   a positive electrode electrolytic solution part provided between the positive electrode current collector and the negative electrode current collector so as to be in contact with the positive electrode current collector, the positive electrode electrolytic solution part comprising a positive electrode active material and a positive electrode electrolytic solution; and
   a negative electrode electrolytic solution part provided between the positive electrode current collector and the negative electrode current collector so as to be in contact with the negative electrode current collector, the negative electrode electrolytic solution part comprising a negative electrode active material and a negative electrode electrolytic solution,
   wherein
   the positive electrode electrolytic solution comprises an electrolyte salt and a non-aqueous solvent comprising a first solvent,
   the negative electrode electrolytic solution comprises an electrolyte salt and a non-aqueous solvent comprising a second solvent,
   the second solvent is a solvent having a reduction potential that is lower than an eigenvalue depending on the negative electrode active material,
   the positive electrode electrolytic solution does not comprise the second solvent,
   the negative electrode electrolytic solution does not comprise the first solvent, and
   the non-aqueous solvent contained in the positive electrode electrolytic solution and the non-aqueous solvent contained in the negative electrode electrolytic solution are different from each other.

2. The secondary battery according to claim 1, wherein the first solvent is a solvent having an oxidation potential that is higher than an eigenvalue depending on the positive electrode active material.

3. The secondary battery according to claim 1, further comprising an electrolyte layer between the positive electrode electrolytic solution part and the negative electrode electrolytic solution part.

4. The secondary battery according to claim 1, wherein the positive electrode electrolytic solution part further comprises a polymer capable of gelling the non-aqueous solvent.

5. The secondary battery according to claim 1, wherein the negative electrode electrolytic solution part further comprises a polymer capable of gelling the non-aqueous solvent.

6. The secondary battery according to claim 1, wherein the second solvent is at least one selected from the group consisting of 12-crown-4, 18-crown-6, 1,2-dimethoxyethane, tetraethylene glycol dimethyl ether, γ-butyrolactone, 1-methyl-2-pyrrolidinone, ethyl heptanoate, tetrahydrofuran, ethylene glycol bis(propionitrile)ether, 2-(methylamino)ethanol, and diaminohexane.

7. The secondary battery according to claim 1, wherein a content of the second solvent is 10% by mass or more on a basis of a total amount of the non-aqueous solvent in the negative electrode electrolytic solution.

8. The secondary battery according to claim 1, wherein the first solvent is at least one selected from the group consisting of tris(2,2,2-trifluoroethyl)phosphate, acetonitrile, succinonitrile, adiponitrile, chloroethylene carbonate, nitromethane, and ethylene carbonate.

9. The secondary battery according to claim 1, wherein a content of the first solvent is 10% by mass or more on a basis of a total amount of the non-aqueous solvent in the positive electrode electrolytic solution.

10. The secondary battery according to claim 1, wherein the negative electrode electrolytic solution part further comprises a binder, and
    the negative electrode active material is a negative electrode active material comprising silicon as a constituent element and is retained in the negative electrode current collector.

11. The secondary battery according to claim 1, wherein the positive electrode electrolytic solution part further comprises a binder, and
    the positive electrode active material is a positive electrode active material having an operating potential of 4 V or more with respect to a metallic lithium potential and is retained in the positive electrode current collector.

* * * * *